United States Patent
Adler-Golden

(10) Patent No.: US 10,643,309 B2
(45) Date of Patent: May 5, 2020

(54) SIGNAL-TO-NOISE ENHANCEMENT

(71) Applicant: Spectral Science, Inc., Burlington, MA (US)

(72) Inventor: Steven Adler-Golden, Newtonville, MA (US)

(73) Assignee: Spectral Sciences, Inc., Burlington, MA (US)

( * ) Notice: Subject to any disclaimer, the term of this patent is extended or adjusted under 35 U.S.C. 154(b) by 44 days.

(21) Appl. No.: 15/808,063

(22) Filed: Nov. 9, 2017

(65) Prior Publication Data

US 2019/0139196 A1    May 9, 2019

(51) Int. Cl.

| G06K 9/40 | (2006.01) |
|---|---|
| G06T 5/00 | (2006.01) |
| G06T 5/50 | (2006.01) |
| G01J 3/28 | (2006.01) |

(52) U.S. Cl.
CPC ............... *G06T 5/002* (2013.01); *G06T 5/50* (2013.01); *G01J 3/28* (2013.01); *G01J 3/2823* (2013.01); *G01J 2003/2826* (2013.01); *G01J 2003/2843* (2013.01); *G06T 2207/10016* (2013.01); *G06T 2207/10036* (2013.01); *G06T 2207/20076* (2013.01)

(58) Field of Classification Search
CPC ....... G01J 2003/2826; G01J 2003/2843; G01J 3/2823; G06T 5/002; G06T 5/50; G06T 2207/10016
See application file for complete search history.

(56) References Cited

U.S. PATENT DOCUMENTS

| 8,358,866 B2 | 1/2013 | Qian et al. | |
|---|---|---|---|
| 2003/0187616 A1* | 10/2003 | Palmadesso | G06F 17/16 |
| | | | 702/181 |
| 2014/0354868 A1* | 12/2014 | Desmarais | H04N 5/23293 |
| | | | 348/333.01 |

OTHER PUBLICATIONS

Lennon et al, ("Nonlinear filtering of hyperspectral images with anisotropic diffusion", 2002 IEEE, p. 2477-2479) (Year: 2002).*
Adler-Golden, S.M., "Improved Hyperspectral Anomaly Detection in Heavy-Tailed Backgrounds," IEEE, First Annual WHISPERS Conference, Grenoble, FR (2009).
Adler-Golden, S.M., S.C. Richtsmeier, and R.M. Shroll, "Suppression of Subpixel Sensor Jitter Fluctuations using Temporal Whitening," Proc. SPIE 6969, Signal and Data Processing of Small Targets 2008, 69691D (Apr. 16, 2008); doi: 10.1117/12.780005.
Bjorgan, A., and Randeberg, L.L., "Real-Time Noise Removal for Line-Scanning Hyperspectral Devices Using a Maximum Noise Fraction-Based Approach," Sensors (Basel, Switzerland),15(2): 3362-3378, 2015, doi:10.3390/s150203362.

(Continued)

*Primary Examiner* — Amara Abdi
(74) *Attorney, Agent, or Firm* — Brian M. Dingman; Dingman IP Law, PC

(57) ABSTRACT

This disclosure relates to processing a spectral dataset, such as a hyperspectral image or a large collection of individual spectra taken with the same spectrometer, to increase the signal-to-noise ratio. The methods can also be used to process a stack of images that differ by acquisition time rather than wavelength. The methods remove most of the sensor background noise with minimal corruption of image texture, anomalous or rare spectra or waveforms, and spectral or time resolution.

8 Claims, 11 Drawing Sheets

(56) References Cited

OTHER PUBLICATIONS

Green, A.A., M. Berman, P. Switzer, and M.D. Craig, "A Transformation for Ordering Multispectral Data in Terms of Image Quality with Implications for Noise Removal," IEEE Transactions on Geoscience and Remote Sensing, 26(1):6574, 1988.
Othman, H. and Qian, S., "Noise reduction of hyperspectral imagery using hybrid spatial-spectral derivative-domain wavelet shrinkage", IEEE Trans. Geosci. Remote Sensing, vol. 44 (2), pp. 397-408, 2006.
Phillips, R.D., L.T. Watson, C.E. Blinn and R.H. Wynne "An adaptive noise reduction technique for improving the utility of hyperspectral data," Pecora 17, The Future of Land Imaging . . . Going Operational, Denver, CO, Nov. 18-20, 2008.
Qian, S., J. Levesque and R. Neville "Evaluation of Noise Removal of Radiance Data on Onboard Data Compression of Hyperspectral Imagery," 2005 WSEAS Int. Conf. on Remote Sensing, Venice, Italy, pp. 37-42, Nov. 2-4, 2005.
Sihag, R., R. Sharma and V. Setia, "Wavelet Thresholding for Image De-noising," ICVCI 2011, Proc. Int. J. Computer Applic. 2011.
Simoncelli, E.P. and Adelson, "Noise Removal via Bayesian Wavelet Coring," Proc. 3rd IEEE Intl. Conf. on Image Processing, vol. I, pp. 379-382, Lausanne, Sep. 16-19, 1996.

* cited by examiner

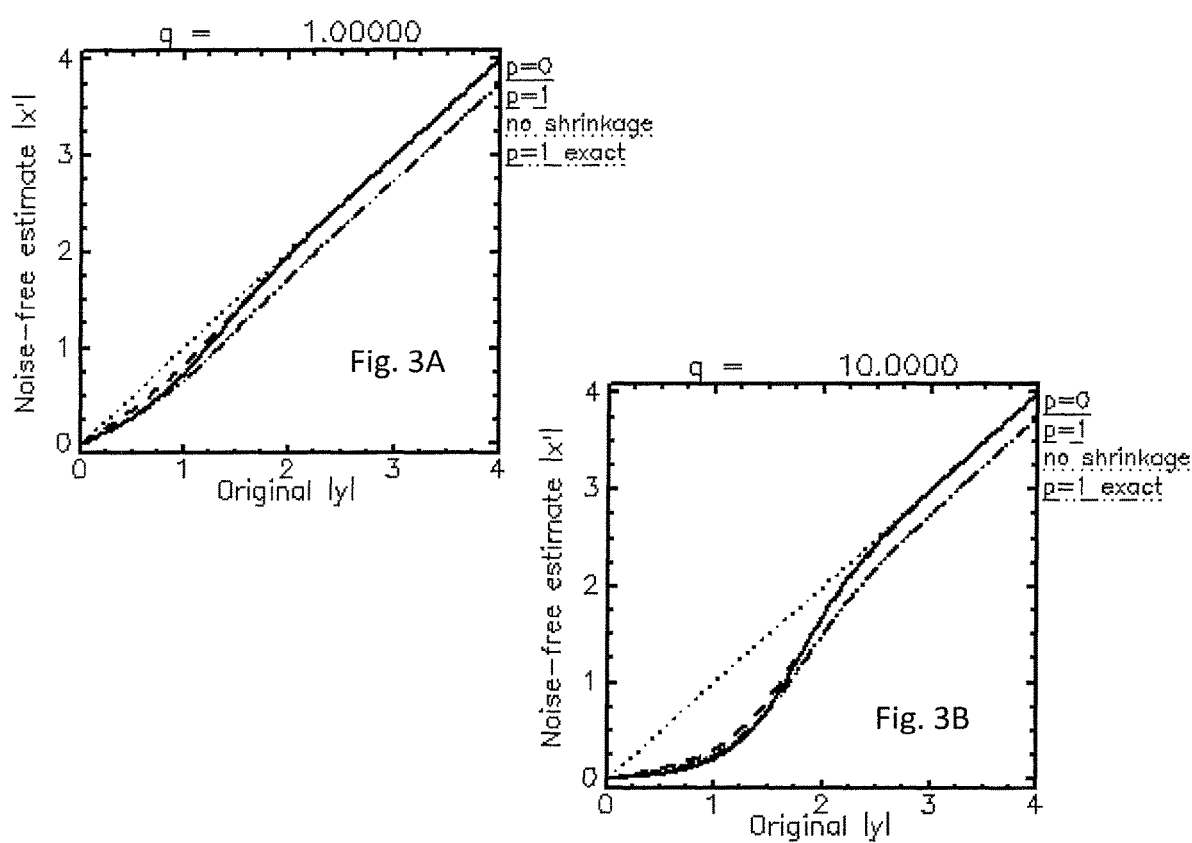

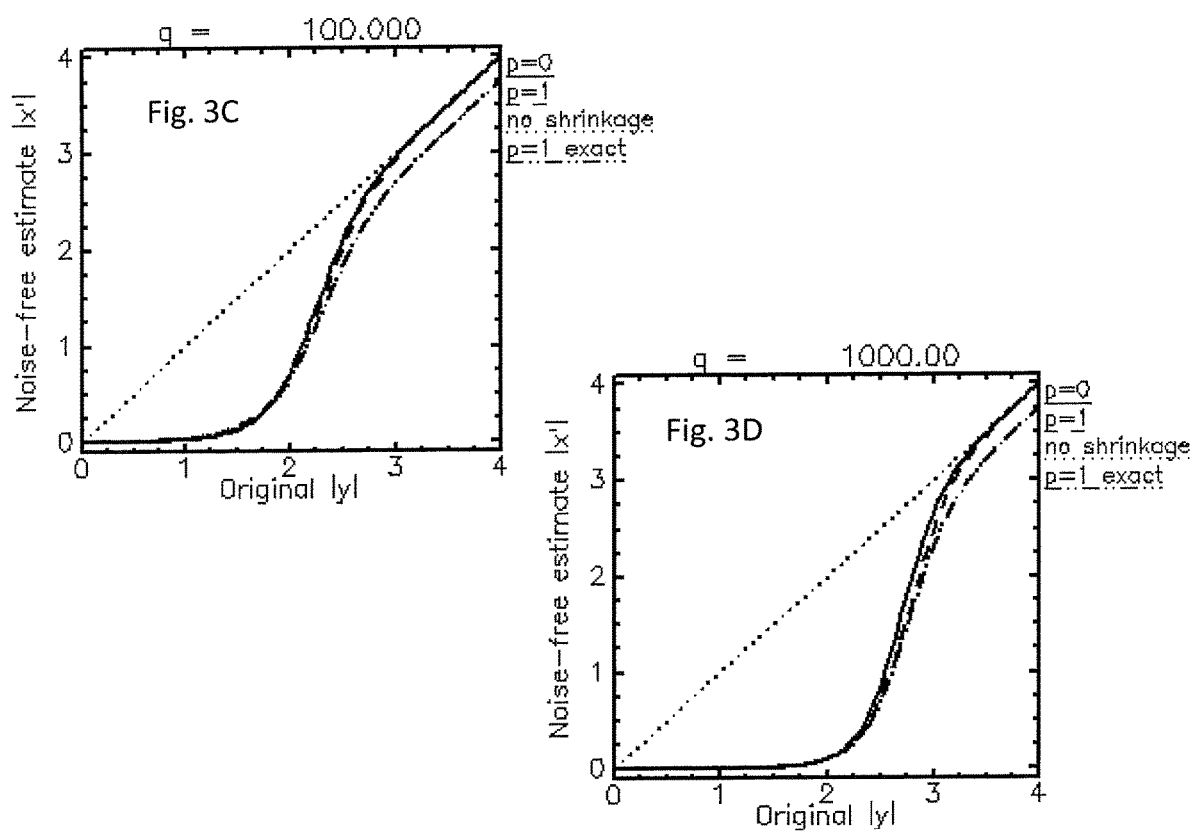

SIGNAL-TO-NOISE ENHANCEMENT

BACKGROUND

Field

This disclosure relates to processing a spectral dataset, such as a hyperspectral image or a large collection of individual spectra taken with the same spectrometer, to increase the signal-to-noise ratio. The methods can also be used to process a stack of images that differ by acquisition time rather than wavelength. The methods remove most of the sensor background noise with minimal corruption of image texture, anomalous or rare spectra or waveforms, and spectral or time resolution.

Description of the Related Art

In hyperspectral imaging (HSI) sensors, images are collected in which each spatial pixel contains a spectrum—that is, a set of measured light intensities in a large number of spectral bands, typically tens to hundreds, each defined by a wavelength range and response function. Electronic noise, which may arise from the sensor itself or from statistical fluctuations in the background radiation, adds a corrupting component to the measurements, interfering with the data analysis. In the infrared (IR) region, optical sensors are especially susceptible to background noise. Measures to reduce noise in IR sensors, such as aggressive cooling and selection of only the best detectors, can make the superior IR sensors extremely expensive. Consequently, there is a need for data post-processing algorithms that can mitigate the effects of noise in the spectral data and provide useful data products from less expensive sensors. Certain of these algorithms might also be usefully applied to spectral datasets obtained with a non-imaging sensor that makes a large number of sequential spectral measurements, such as a laser Raman or fluorescence spectrometer, where there may be considerable noise from the scattered light background.

A number of methods for spectral imagery that reduce sensor noise, referred to as de-noising algorithms, have been described in the literature, and tend to fall into two major categories. Methods in the first category are known as spectral noise reduction methods since they work in the wavelength (spectral) coordinate and provide additional applicability to non-image datasets. Methods in the second category work in image spatial coordinates, and process one wavelength image at a time. The two methods can be combined, as in U.S. Pat. No. 8,358,866.

Qian, S., J. Lévesque and R. Neville, "Evaluation of Noise Removal of Radiance Data on Onboard Data Compression of Hyperspectral Imagery," 2005 WSEAS Int. Conf. on Remote Sensing, Venice, Italy, pp. 37-42, Nov. 2-4, 2005 ("Qian [2005]") describes a spectral noise reduction method for HSI data that separates the pixel spectra into distinct classes that differ by an amount greater than the noise level. The spectra in each class are then replaced by the class averages, thereby reducing the noise. A drawback of this method is that the number of required classes increases as the diversity of spectra increases and as the noise level decreases, resulting in increasing and unpredictable computation time. Another drawback is that many spectra may wind up in classes consisting only of themselves, even though they are similar to other spectra; those spectra do not undergo any noise reduction. Another drawback is that the transformation from input to output spectra is discontinuous, potentially leading to step artifacts in the output.

An alternative, more common spectral noise reduction method is to perform Maximum Noise Fraction (MNF) truncation, as first described by Green, A. A., M. Berman, P. Switzer, and M. D. Craig, "A Transformation for Ordering Multispectral Data in Terms of Image Quality with Implications for Noise Removal," IEEE Transactions on Geoscience and Remote Sensing, 26(1):6574, 1988 ("Green [1988]"); a recent adaptation for HSI data processing is found in Bjorgan, A., and Randeberg, L L., "Real-Time Noise Removal for Line-Scanning Hyperspectral Devices Using a Maximum Noise Fraction-Based Approach," Sensors (Basel, Switzerland), 15(2): 3362-3378, 2015, doi:10.3390/s150203362 ("Bjorgan [2015]"). The MNF operation transforms the data to an orthonormal coordinate system in which most of the noise is isolated from most of the signal. In this method, a variance or covariance linear operator describing the sensor noise is estimated from either the data itself or from a sensor specification. The data are then multiplied by the inverse square root of the operator, which "whitens" the noise, and the result is then processed with a Principal Component (PC) transformation. The PC transformation projects the spectra onto the eigenvectors of the spectral covariance matrix of the noise-whitened data. Each eigenvector has a corresponding eigenvalue. The combined noise whitening step and PC transformation can be considered as a single linear operation comprising the MNF transform, as described in Green [1988], Phillips, R. D., L. T. Watson, C. E. Blinn and R. H. Wynne, "An adaptive noise reduction technique for improving the utility of hyperspectral data," Pecora 17, *The Future of Land Imaging . . . Going Operational*, Denver, Colo., Nov. 18-20, 2008 ("Phillips [2008]") and Bjorgan [2015]. The MNF components (i.e., the projection coefficients) that correspond to very small eigenvalues, comparable to the noise variance, are dominated by noise. To suppress the noise in the data, these MNF components are set to zero. The data are then processed with the inverse MNF transform to restore the data to their original units. A serious drawback of this method is that this processing truncates the data dimensionality. This results in distortion of "rare" or anomalous spectra in the dataset, and makes it difficult, if not impossible, to use the processed data for a rare target detection application.

An improvement on the original MNF method for hyperspectral image denoising is described by Phillips [2008]. Instead of zeroing the noisy small-eigenvalue MNF components they are processed with spatial median filtering. This reduces the noise and retains the major spatial structure in those components, but their spatial resolution is reduced. As a result, rare or unusual spectra in the dataset that occupy a small area, such a few pixels or less, are distorted.

The second general class of noise reduction methods involves performing a wavelet transform on each wavelength band image. Example methods are described in Sihag, R., R. Sharma and V. Setia, "Wavelet Thresholding for Image De-noising," ICVCI 2011, Proc. Int. J. Computer Applic. 2011 ("Sihag [2011]") and Simoncelli, E. P. and Adelson, "Noise Removal via Bayesian Wavelet Coring," Proc. 3$^{rd}$ IEEE Intl. Conf. on Image Processing, Vol I, pp. 379-382, Lausanne, 16-19 Sep. 1996 ("Simoncelli [1996]"). The sensor noise is preferentially found in the wavelet decomposition images that correspond to fine spatial structure. These decomposition images are processed with a threshold function. Signal absolute values below the threshold, which consist predominantly of noise, are set to zero, while signal absolute values above the threshold, which consist predominantly of true signal, are either left unchanged (with a "hard" threshold) or reduced (with a "soft" threshold). The soft threshold function is also known as a shrinkage function [Sihag, 2011]. The thresholded wavelet decomposition images are then processed with the inverse wavelet transform to yield a de-noised version of the original wavelength band image. A drawback of this method is that it has difficulty distinguishing sensor noise from surface texture, and thus it may over-smooth the image and degrade its sharpness. This will in turn distort the spectra. Also, wavelet methods are applicable only to image data, not individual spectra.

U.S. Pat. No. 8,358,866 for de-noising HSI data combines a wavelet transform method with a spectral filtering method. The method is also described in Othman, H. and Qian, S., "Noise reduction of hyperspectral imagery using hybrid spatial-spectral derivative-domain wavelet shrinkage", IEEE Trans. Geosci. Remote Sensing, Vol. 44 (2), pp. 397-408, 2006 ("Othman [2006]"). First, wavelet de-noising is performed. The output is further processed by a spectral low-pass filtering step, involving taking differences of adjacent wavelengths, smoothing the result with a running low-pass filter, and then reversing the differencing process to restore the spectra, but with noise further reduced. This method has the advantages and disadvantage of other wavelet transform methods, but is capable of additional noise reduction via the spectral filtering step. On the other hand, the spectral filtering process can distort data that contain true spectral features that are comparable in resolution to the spectral resolution of the sensor. As an example of such features, remote sensing data acquired in the long wavelength infrared (LWIR) wavelength region contains fine spectral structure from atmospheric water vapor spectral lines. Since this structure is as narrow as, or narrower than, the spacing between adjacent wavelength bands of typical LWIR hyperspectral sensors, this structure may be lost in the low-pass filtering step.

Certain types of hyperspectral imaging sensors collect the data in a staring mode, in which images of a fixed view are sequentially collected at different wavelengths by tuning a wavelength-selective optical element. In this situation, the images differ in their acquisition time, and comprise staring video imagery. Therefore, it will occur to those skilled in the art that many of the HSI denoising algorithms may also be applied to ordinary staring video imagery, in which the wavelength is not being varied. These data, in which the time dimension replaces the wavelength dimension, comprise images of waveforms rather than images of spectra.

SUMMARY

The signal-to-noise enhancement, or de-noising, of the present disclosure is aimed at improving the utility of hyperspectral imagery or other large spectral datasets without introducing significant spectral distortion in or spectral smoothing of the data, even for rare or anomalous spectra. In particular, this disclosure is aimed at enhancing the imagery from affordable infrared hyperspectral sensors, such as current commercial sensors operating in the mid-infrared to long-wavelength infrared. Since this method provides the best noise reduction for abundant spectra in the dataset, the method should especially benefit terrain classification applications, such as in minerology, agriculture, and land use. Another object of this disclosure is to provide a de-noising method for staring video imagery, which has the equivalent data structure to hyperspectral imagery. Another objective is to provide a method that is fully automated. Another objective is to provide a moderate, and predictable, computing time.

In one aspect, a signal-to-noise enhancement method includes receiving from a spectrometer a spectral dataset that comprises a multiplicity of spectra measured with the spectrometer, in which the number of spectra exceeds the number of measured wavelength bands of the spectrometer, estimating the covariance matrix of background noise associated with the measured spectra, transforming the multiplicity of spectra to Maximum Noise Fraction (MNF) components, each component comprising the coefficients resulting from projection of the multiplicity of spectra onto an individual MNF eigenvector, calculating nonlinear mathematical functions, associated with each individual MNF eigenvector, that convert the values of the MNF components of a given spectrum into estimated values of the corresponding noise-free MNF components of the given spectrum, applying the inverse MNF transform to convert the estimated noise-free MNF components of the multiplicity of spectra back into the original units of the spectra, and generating an output spectral dataset from the converted estimated noise-free MNF components of the multiplicity of spectra.

Embodiments may include one of the above and/or below features, or any combination thereof. The nonlinear mathematical functions may be given by: $S(y)=\exp(-|y/s|^P)/[r \exp(-y^2)+\exp(-|y/s|^P)]$. The nonlinear mathematical functions may be given by: $S(y)=1/[r \exp(-y^2)+1]$. The multiplicity of spectra may comprise a hyperspectral image.

In another aspect, a system includes a spectrometer that provides a multiplicity of spectra, in which the number of spectra exceeds the number of measured wavelength bands of the spectrometer, and digital image processing circuitry which, in operation: estimates the covariance matrix of background noise associated with the measured spectra, transforms the multiplicity of spectra to Maximum Noise Fraction (MNF) components, each component comprising the coefficients resulting from projection of the multiplicity of spectra onto an individual MNF eigenvector, calculates nonlinear mathematical functions, associated with each individual MNF eigenvector, that convert the values of the MNF components of a given spectrum into estimated values of the corresponding noise-free MNF components of the given spectrum, applies the inverse MNF transform to convert the estimated noise-free MNF components of the multiplicity of spectra back into the original units of the spectra, and generates an output spectral dataset from the converted estimated noise-free MNF components of the multiplicity of spectra.

Embodiments may include one of the above and/or below features, or any combination thereof. The nonlinear mathematical functions may be given by: $S(y)=\exp(-|y/s|^P)/[r \exp(-y^2)+\exp(-|y/s|^P)]$. The nonlinear mathematical functions may be given by: $S(y)=1/[r \exp(-y^2)+1]$. The spectrometer may comprise a hyperspectral imaging sensor.

In another aspect, a signal-to-noise enhancement method includes receiving from an imaging device a time series of images that comprise a multiplicity of image frames, in which the number of pixels exceeds the number of image frames, estimating the covariance matrix of the background noise associated with the images, transforming the multiplicity of images to Maximum Noise Fraction (MNF) components, each component comprising the coefficients resulting from projection of the pixel waveforms onto an individual MNF eigenvector, calculating nonlinear mathematical functions, associated with each individual MNF eigenvector, that convert the values of the MNF components of a given pixel waveform into estimated values of the corresponding noise-free MNF components of the given pixel waveform, and applying the inverse MNF transform to convert the estimated noise-free MNF components of the multiplicity of pixel waveforms back into the original units of the images. An output image dataset is generated from the converted estimated noise-free MNF components of the multiplicity of pixel waveforms.

Embodiments may include one of the above and/or below features, or any combination thereof. The nonlinear mathematical functions may be given by: $S(y)=\exp(-|y/s|^P)/[r \exp(-y^2)+\exp(-|y/s|^P)]$. The nonlinear mathematical functions may be given by: $S(y)=1/[r \exp(-y^2)+1]$. The covariance matrix of the background noise may comprise a diagonal constant matrix.

In another aspect, a system includes a camera that provides a time series of images that comprise a multiplicity of image frames, in which the number of pixels exceeds the number of image frames, and digital image processing circuitry which, in operation: estimates the covariance matrix of the background noise associated with the images, transforms the multiplicity of images to Maximum Noise Fraction (MNF) components, each component comprising the coefficients resulting from projection of the pixel waveforms onto an individual MNF eigenvector, calculates nonlinear mathematical functions, associated with each individual MNF eigenvector, that convert the values of the MNF components of a given pixel waveform into estimated values of the corresponding noise-free MNF components of the given pixel waveform, applies the inverse MNF transform to convert the estimated noise-free MNF components of the multiplicity of pixel waveforms back into the original units of the images, and generates an output image dataset from the converted estimated noise-free MNF components of the multiplicity of pixel waveforms.

Embodiments may include one of the above and/or below features, or any combination thereof. The nonlinear mathematical functions may be given by: $S(y)=\exp(-|y/s|^P)/[r \exp(-y^2)+\exp(-|y/s|^P)]$. The nonlinear mathematical functions may be given by $S(y)=1/[r \exp(-y^2)+1]$. The covariance matrix of the background noise may comprise a diagonal constant matrix.

BRIEF DESCRIPTION OF THE DRAWINGS

Other objects, features and advantages will occur to those skilled in the art from the following detailed description, and the accompanying drawings, in which:

FIGS. 3A-3D comprises plots of the MNF component optimal-estimate noise-free absolute value, $|x'(y)|$, as a function of the original absolute value, $|y|$, from Eqs. (3), (8) and (10), with $s=\frac{1}{2}$ in the generalized Laplacian prior PDF, Eq. (7).

DETAILED DESCRIPTION

The signal-to-noise enhancement of this disclosure uses the MNF transform method for separating signal and noise components in multidimensional datasets in combination with the method of applying nonlinear multiplicative factors, called shrinkage functions, to the MNF components of each sample or pixel. In one example, a separate shrinkage function is defined for each MNF component using the Bayesian signal estimation formula. In essence, this method suppresses MNF transform values that are within the noise level, while retaining values that exceed the noise level, which arise from anomalous or rare samples.

First Example

Figure 1A:
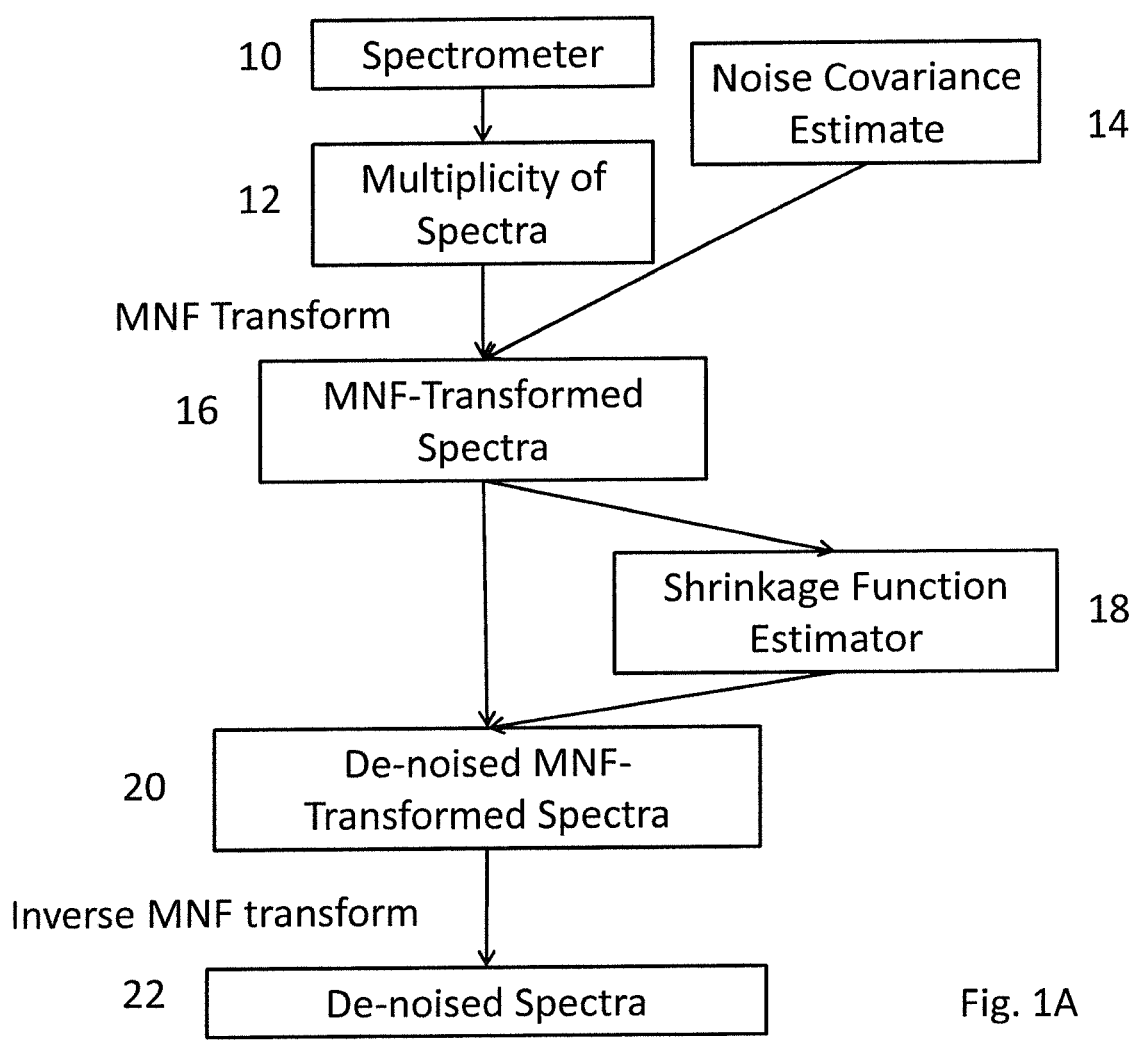
FIG. 1A illustrates steps in a signal-to-noise enhancement method.
Figure 1B:
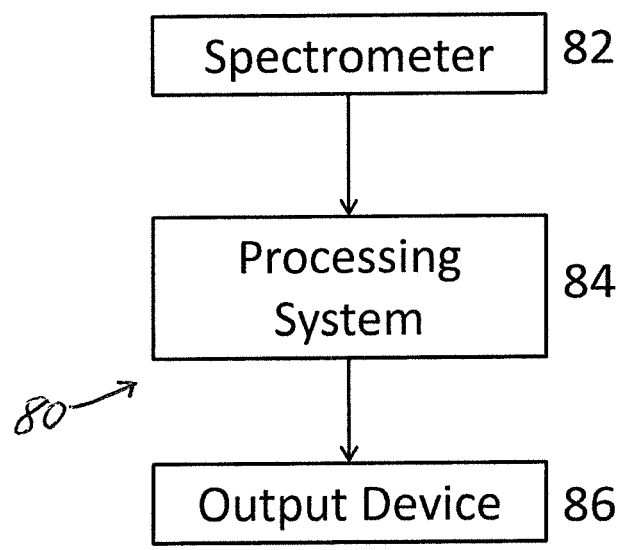
FIG. 1B is a functional block diagram of a system that can be used to accomplish a signal-to-noise enhancement.

In a first example of a signal-to-noise enhancement shown in FIG. 1A, a plurality of spectra 12 from a spectrometer 10 are fed into the processing system, comprised of items 14, 16, 18 and 20. The number of spectra must be greater than the number of wavelength measurements, or bands, in the spectra, denoted N. The invention outputs de-noised spectra 22. The spectrometer may be a hyperspectral imager. FIG. 1B illustrates system 80 that can be used to accomplish the signal-to-noise enhancement of FIG. 1A. Spectrometer 82 provides an output (a plurality of spectra) to processing system 84. Processing system 84 may be a computer that is programmed to carry out the signal-to-noise enhancement. The output (which can be the input spectra, but de-noised) are provided to output device 86. Output device 86 may be a printer or a computer display device, for example.

An estimate of the N×N noise covariance matrix 14 may be obtained by a number of different methods, including by analysis of the data itself or from a specification of the RMS noise supplied by the sensor manufacturer. Specific methods are described in Green [1988], Phillips [2008] and Bjorgan [2015]. Typically, the noise in different wavelength bands is considered to be uncorrelated, in which case the noise covariance is a diagonal matrix of noise variances for each wavelength band. If only an average noise variance is available, then the elements of the diagonal matrix are identical.

The MNF transform is described in numerous papers, including Phillips [2008] and Bjorgan [2015]. It can be regarded as a sequence of two steps. In the first step, which is a noise-whitening operation, the data are multiplied by the square root of the noise covariance matrix inverse. If the noise covariance matrix is diagonal, the whitening step is a spectral weighting of the data, in which the data are divided by the noise standard deviation. In the second step, a Principal Component (PC) transform is applied to the data. The MNF-transformed data consist of the projections of the mean spectrum-subtracted data onto the eigenvectors of the PC transform. We assume without loss of generality that the eigenvectors have been unit-normalized.

The two mathematical steps outlined above are equivalent to a single data transformation. The first step is to subtract the mean spectrum from the data. Using the notation in Phillips [2008], let $\Sigma s$ denote the N×N covariance matrix of the spectral data and ΣN denote the N×N covariance matrix of the noise. The matrix of N eigenvectors, V, is the solution to the equation $$\Sigma_S \Sigma_N^{-1} = V \Lambda V^{-1} \quad (1)$$

where Λ is the diagonal matrix of N eigenvalues that correspond to matrix V. As is usual, for the purposes of this discussion we assume that the eigenvectors and eigenvalues, which are positive, are ordered in decreasing eigenvalue size.

The projection of the mean-subtracted data onto the N eigenvectors of the V matrix yields a set of N coefficients for each spectrum, which we denote $y_j$ for a given eigenvector j. We shall refer to the $y_j$ as the $j^{th}$ MNF component. If the original data comprise a hyperspectral image (data cube), then each of the N MNF components $y_j$ comprises an image. Collectively, the $y_j$ comprise the MNF-transformed spectral dataset 16.

Next, we seek optimal estimates of the "true" MNF components, $x_j$, which are uncontaminated with background noise, $n_j$, based on the observed $y_j=x_j+n_j$. This is done by defining a shrinkage function, denoted $S_j(y_j)$, which is a multiplicative factor that converts the observed noise-containing MNF component $y_j$ into an estimate of the noise-free MNF component. That is, the optimal estimate $x'_j$ is given by $$x'_j(y_j) = S_j(y_j) y_j \quad (2)$$

Figure 2:
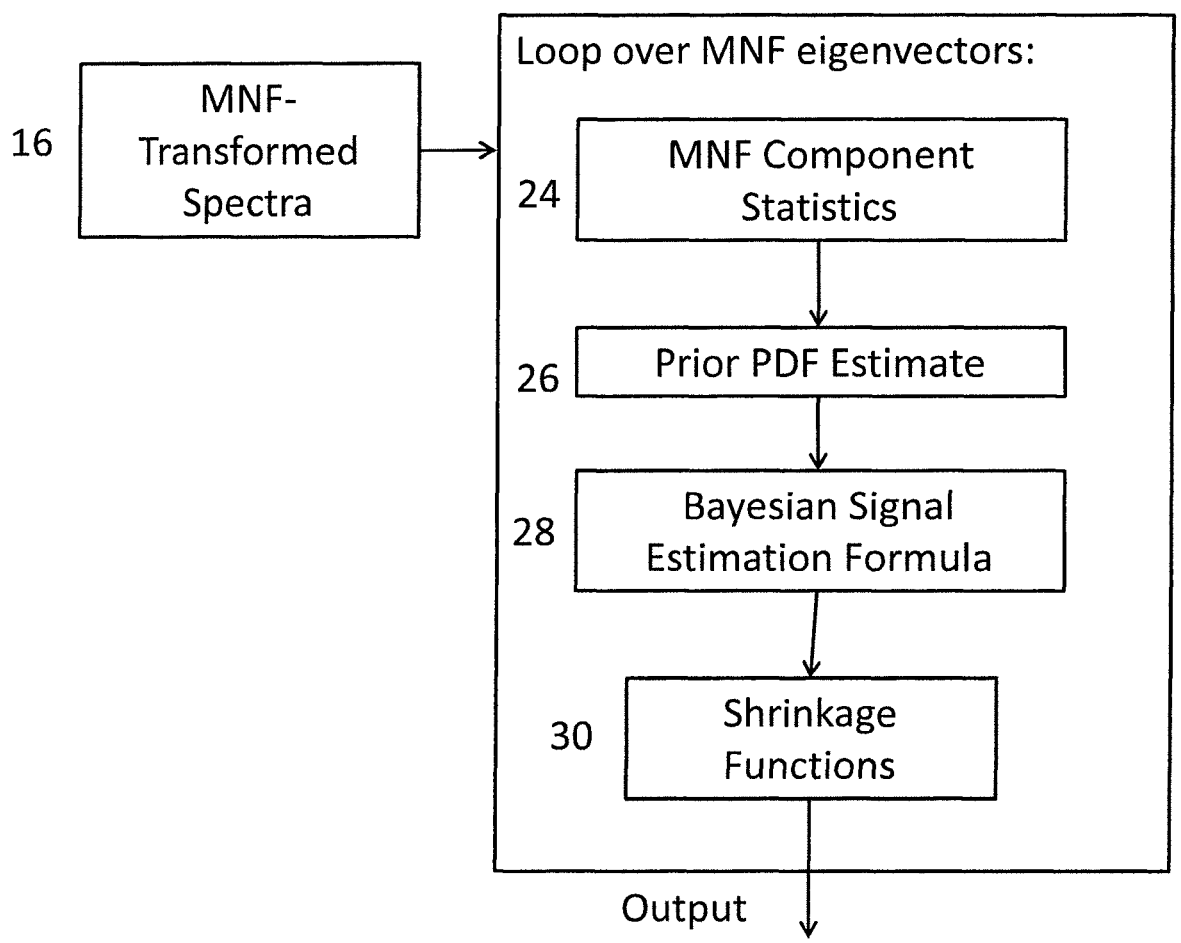
FIG. 2 illustrates steps in an example of the shrinkage function estimator of FIG. 1A.

The preferred embodiment of the shrinkage function estimator procedure 18 is shown in FIG. 2. The basic approach is described in Simoncelli [1996], who however applied it to wavelet transforms rather than MNF transforms. The first step is to estimate prior probability distribution functions (PDFs) 26, denoted $P_j(x_j)$, associated with the noise-free MNF components. There a number of ways by which this may be done. In one example, Simoncelli [1996] describes a "blind" algorithm by which the two parameters of a generalized Laplacian prior PDF (Simoncelli [1996] Equation 2) corrupted by Gaussian white noise may be estimated from the second and fourth moments of the $y_j$ distribution across the dataset. These moments are but one example of MNF component statistics 24 that can potentially be employed to estimate the prior PDFs.

The optimal estimate of a noise-free MNF component value, denoted $x'_j$, is its mean value in the posterior PDF, which includes the added noise. This mean value, which provides an unbiased-least squares estimate of $x_j$ given $y_j$, is computed from the Bayesian signal estimation formula 28, found in Simoncelli [1996]. We assume that the noise PDF is the unit-variance Gaussian function, G, and define the function $Q_j(x_j)=x_j P_j(x_j)$. Then the Bayesian signal estimation formula may be compactly written as a quotient of convolutions, $$x'_j(y_j) = (G * Q_j)(y_j) / (G * P_j)(y_j) \quad (3)$$

Using Eq. (2), the shrinkage function 30 is then given by $$S_j(y_j) = x'_j(y_j)/y_j. \quad (4)$$

Since analytical solutions to Eq. (3) do not exist for many useful functional forms for the prior PDF, Simoncelli [1996] proposes evaluating the convolutions numerically. However, analytical approximations are useful for developing approximate shrinkage functions 30 that provide good de-noising results. Some examples are described below.

For the small-eigenvalue j's, which are dominated by noise, it is assumed that the vast majority of the spectra have MNF component values $x_j$ that are very close to zero; that is, they belong to an extremely narrow PDF. On the other hand, a small minority of the spectra, comprising anomalies and rare spectra, are associated with a relatively broad PDF. Let us therefore approximate the PDF of the true MNF coefficients $P_j(x_j)$ as a weighted sum of a broad distribution $B_j(x_j)$ and a Dirac delta function $D(x_j)$, the latter representing the limit of an extremely narrow distribution:

$$P_j(x_j) = w_j B_j(x_j) + (1-w_j) D(x_j) \quad (5)$$

where $w_j$ is the weighting factor. We further approximate the convolutions in Eq. (3) by assuming that the broad PDF component, $B_j(x_j)$, can be represented as constant within the narrow range of $x_j$ that comprises the bulk of the noise PDF (i.e., within one or two standard deviations of $G(x_j)$), and accordingly we factor $B_j(x_j)$ out of the restricted domain convolution integral. Noting that (1) convolutions of sums are sums of convolutions, (2) the convolution of a Dirac delta function with a Gaussian is a Gaussian, and (3) the convolution of a linear function with a Gaussian is a linear function, an approximate solution to Eq. (3) is $$x'_j(y) = y_j \{ w_j B_j(y_j) / [(1-w_j) G(y_j) + w_j B_j(y_j)] \} \quad (6)$$

The quantity in braces is the approximate shrinkage function $S_j(y_j)$. For the remainder of this discussion we drop the j subscripts for simplicity.

For illustrative purposes, we follow Simoncelli [1996] and assume a generalized Laplacian distribution, $$B(y) \propto \exp(-|y/s|^p) \quad (7)$$

Then we write S(y) in terms of the ratio of G to B at y=0, which we denote r. Simplifying the expression, the approximate shrinkage function becomes $$S(y) = \exp(-|y/s|^p) / [r \exp(-y^2) + \exp(-|y/s|^p)] \quad (8)$$

Simoncelli [1996] suggests a range of exponents, p, from 0.5 to 1.0. Adler-Golden, S. M., "Improved Hyperspectral Anomaly Detection in Heavy-Tailed Backgrounds," *IEEE, First Annual WHISPERS Conference*, Grenoble, FR (2009) ("Adler-Golden [2009]") analyzed PC transforms of HSI data, which are closely related to MNF transforms, and found that the low-noise PC components had typical p values in a similar range. Eq. (8) is a better approximation at smaller p values, and represents the exact solution to Eq. (3) when p=0 (that is, B(y) is a flat distribution up to some maximum absolute y value).

FIGS. 3A-3D compare the noise-free estimation functions x'(y) using the approximate Eq. (8) for p=1 with those from exact numerical solutions to Eq. (3). For reference we include the line x'=y, which corresponds to no shrinkage applied to the data (i.e., the shrinkage factor is 1). We choose a representative value of s=2, corresponding to a B(y) PDF that is twice as wide as the noise PDF at the 1/e points. We consider a wide range of r values, defined by $$r = q \exp(-|2/s|^p) \quad (9)$$

with q=1 (FIG. 3A), 10 (FIG. 3B), 100 (FIG. 3C), and 1000 (FIG. 3D). As will be seen below, defining r in this way provides a good means to compare PDFs corresponding to different p values. FIGS. 3A-3D show that the approximate Eq. (8) solutions for x'(y) are very similar to the exact results for these p=1 cases. The values from Eq. (8) are slightly larger at large y, meaning that its shrinkage estimates are on the conservative side (closer to 1). The agreement would be better at larger values of s (a broader Laplacian distribution).

FIGS. 3A-3D include the Eq. (8) results for p=0, which are exact. In contrast to the formula for p>0, which contains three unknown parameters (s, p and r), the shrinkage function formula for p=0, which is given by $$S(y) = 1/[r \exp(-y^2) + 1] \quad (10)$$

has only a single adjustable parameter, r. The excellent agreement with the p=1 results indicates that, with r properly defined, the shrinkage function has little dependence on p, and thus can be estimated well with little or no knowledge of shape of the broad component of the prior PDF. One requires only an estimate of the relative magnitudes of the narrow (delta function) and broad components of the prior PDF, which sets the value of r.

Figure 4:
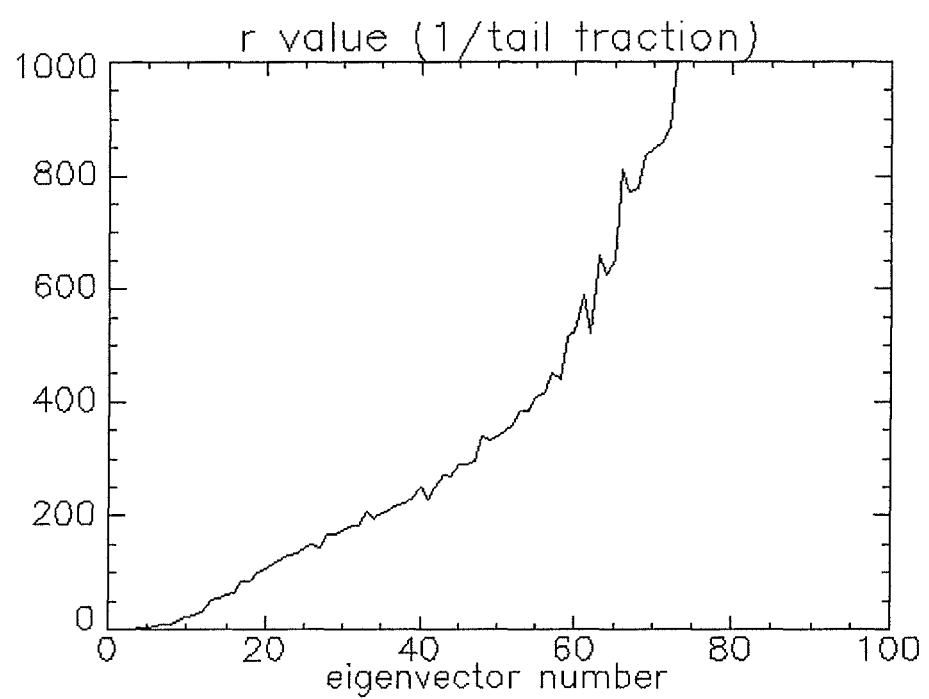
FIG. 4 comprises a plot of the value of r in Eq. (9) versus MNF eigenvector number, based on a histogram analysis of an 82-band long-wavelength infrared (LWIR) hyperspectral image taken with an airborne Telops HyperCam sensor.

With typical hyperspectral datasets, the vast majority of the spectra are well-modeled with just the first few MNF components. Thus, for all but the lowest j values, the broad PDF component is expected to be small compared to the narrow component. In this situation, r can be estimated by histogramming the distribution of y values in the dataset and taking the ratio of the histogram populations at y=0 and y=2. As an application of this method, FIG. 4 shows some estimated r values obtained from histogram population ratios of MNF components in a thermal infrared radiance data cube, which was measured with an airborne Telops Hyper-Cam hyperspectral sensor. At the highest eigenvector numbers (j values), the broad PDF component becomes extremely small (only a tiny fraction of the spectra have y values above the noise level), and the histogram ratio becomes poorly defined. We choose to err on the conservative side by setting a maximum r value of 1000. For the lowest j values, the broad plus narrow component PDF model may be inaccurate. However, this is of little concern, since here the shrinkage function will be close to 1 regardless of what PDF model is assumed.

Having estimated the shrinkage functions 30 by one of the above procedures, Eq. (2) is used to determine the noise-free MNF component estimates, which comprise the de-noised MNF-transformed spectra 20. Applying the inverse MNF transform, which includes adding back the mean spectrum that was removed in the first step of the forward MNF transform, results in the de-noised spectra 22.

Figure 5:
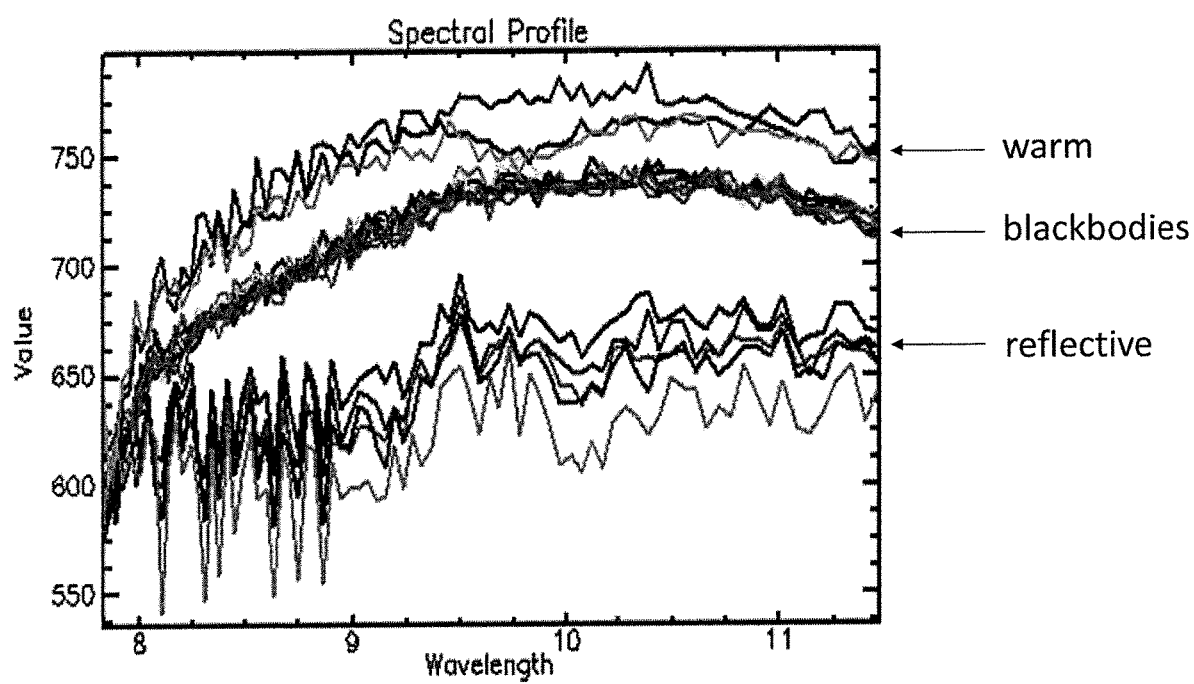
FIG. 5 comprises plots of LWIR spectral radiance in units of microflicks versus micrometers from the hyperspectral image of FIG. 4.
Figure 6:
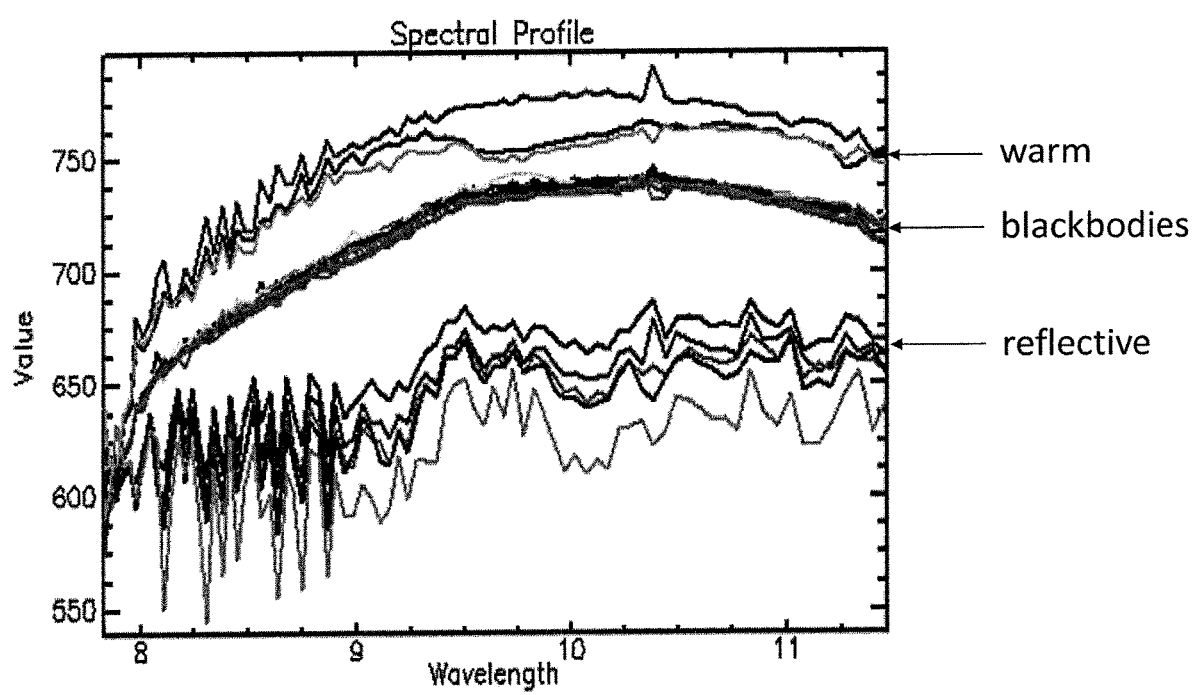
FIG. 6 comprises plots of the same pixel spectra as in FIG. 5 but after processing with the present signal-to-noise enhancement method.

FIGS. 5 and 6 show the application of this signal-to-noise enhancement to the HyperCam radiance data cube. The spectra with maximum values below 700 microflicks are from a patch of reflective material. FIG. 6 shows the same spectra as FIG. 5 obtained after de-noising using the Eq. (9) shrinkage function and the FIG. 4 r values. The noise level is dramatically reduced, especially for the non-reflective surfaces. This is seen in the greatly improved consistency among spectra of the same type of surface, and particularly in the very smooth appearance of the blackbody spectra, which are at a temperature close to that of the atmosphere. At the same time, the de-noising processing preserves the atmospheric spectral structure, which is seen in the spectra of reflective surfaces and warm surfaces. The de-noising processing also preserves the sharp 10.3 micron peak in the brightest spectrum, which appears to be due to an anomaly in the focal plane array response.

Other methods of estimating shrinkage functions 30 from parameters of the MNF components of the spectra may occur to those skilled in the art. These may include:
Evaluating the Bayesian signal estimation formula 28 numerically using a model for the prior PDF estimate 26, where the model is a generalized Laplacian distribution, or a model that includes a Dirac delta function, or a model that includes both;
Using a user-supervised process to estimate the parameters s, p and q in the generalized Laplacian distribution model of the prior PDF estimate 26;
Using a user-supervised process to estimate the parameter r in the shrinkage function equation (10);
As a further approximation, using the same shrinkage function 30 for all N of the MNF components.

Second Example

Figure 7:
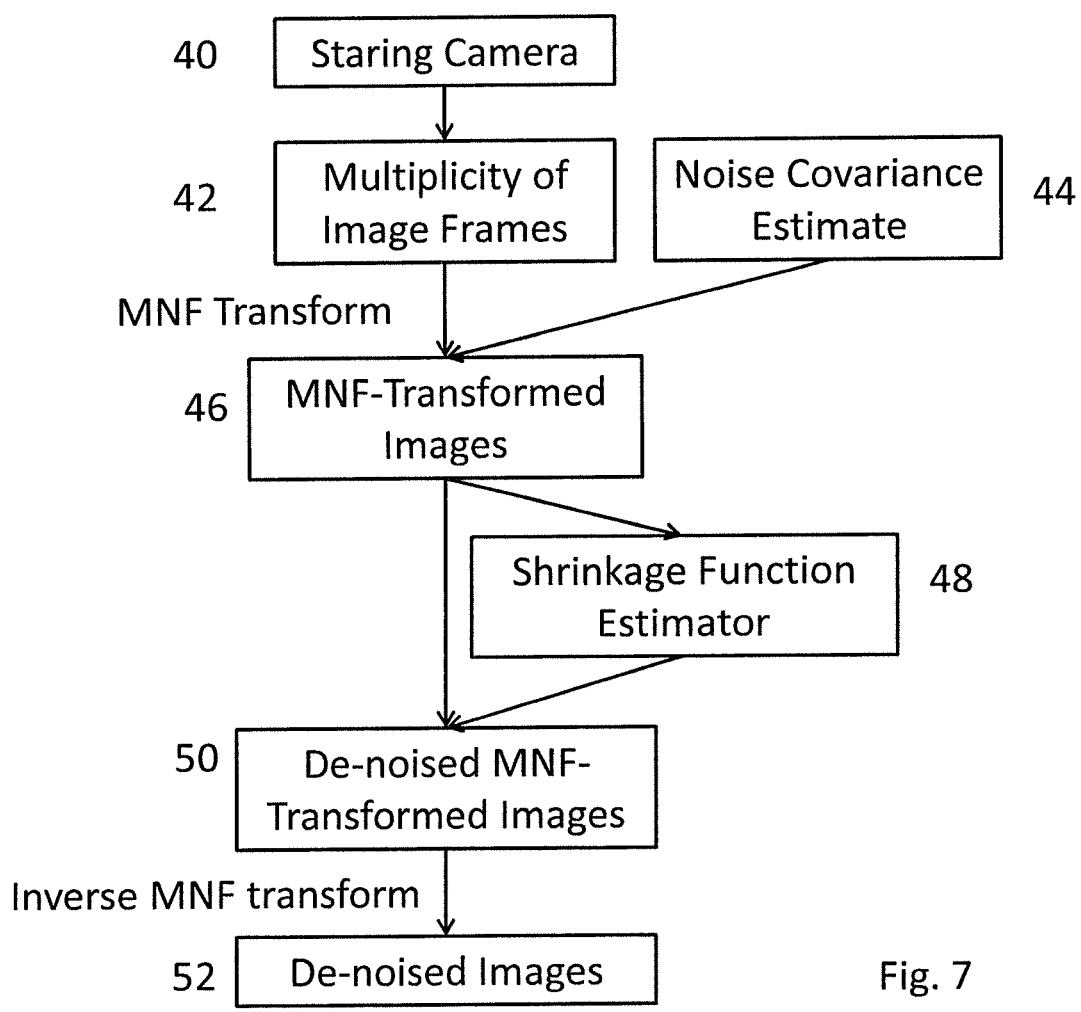
FIG. 7. illustrates steps in another signal-to-noise enhancement method.

In an alternative embodiment of the method shown in FIG. 7, a stack of image frames 42 from a staring camera 40 are fed into the processing system, comprised of items 44, 46, 48 and 50. The number of pixels in the images must be greater than the number of image frames, denoted N. The method outputs de-noised images 52. The shrinkage function estimator 48 is identical to the shrinkage function estimator 18 shown in FIG. 1.

The description of the alternative embodiment is identical to the description of the preferred embodiment, except that "spectrum" is replaced with "pixel waveform", "spectral dataset" is replaced with "image dataset," and "wavelength band" is replaced with "image frame." Specifically,
The first step in the data processing is to subtract the mean waveform (i.e., the set of image means) from the image frames 42.
Let $\Sigma_S$ denote the N×N covariance matrix of the image data and $\Sigma_N$ denote the estimated N×N covariance matrix of the noise 44.
The matrix of N eigenvectors, V, is the solution to Eq. (1).
The projection of the mean-subtracted data onto the N eigenvectors of the V matrix yields a set of N coefficients for each pixel waveform, which we denote $y_j$ for a given eigenvector j. Each of the N MNF components $y_j$ comprises an image; collectively these are the MNF-transformed images 46.
Optimal estimates of the "true" MNF components, $x_j$, which are uncontaminated with background noise, $n_j$, are obtained by defining shrinkage functions, denoted $S_j(y_j)$, according to Eqs. (2), (3) and (4).
For the small-eigenvalue j's, which are dominated by noise, we may assume that the vast majority of the pixel waveforms have MNF component values $x_j$ that are very close to zero, while a small minority of the pixel waveforms are associated with a relatively broad PDF. We may approximate the PDF of the true MNF coefficients $P_j(x_j)$ as a weighted sum of a broad distribution $B(x_j)$ and a Dirac delta function $D(x_j)$, the latter representing the limit of an extremely narrow distribution. Then the same logic found in the preferred embodiment leads to Eqs. (5) through (10).
Other methods of estimating shrinkage functions 48 from parameters of the MNF components may occur to those skilled in the art, and may include all of the methods described in the preferred embodiment.
Having estimated the shrinkage functions 48, Eq. (2) is used to determine the noise-free MNF component estimates, which comprise the de-noised MNF-transformed data 50. Applying the inverse MNF transform, which includes adding back the mean waveform that was removed in the first step of the forward MNF transform, results in the de-noised images 52.

Application of this method to a stack of image frames is most beneficial when the bulk of the pixel waveforms can be represented with a small number of independent components, i.e., a small number of dimensions. This situation may apply when there is time variation in only a small number of pixels, and/or when image-wide motion, such as pointing jitter, is of low amplitude.

Figure 8:
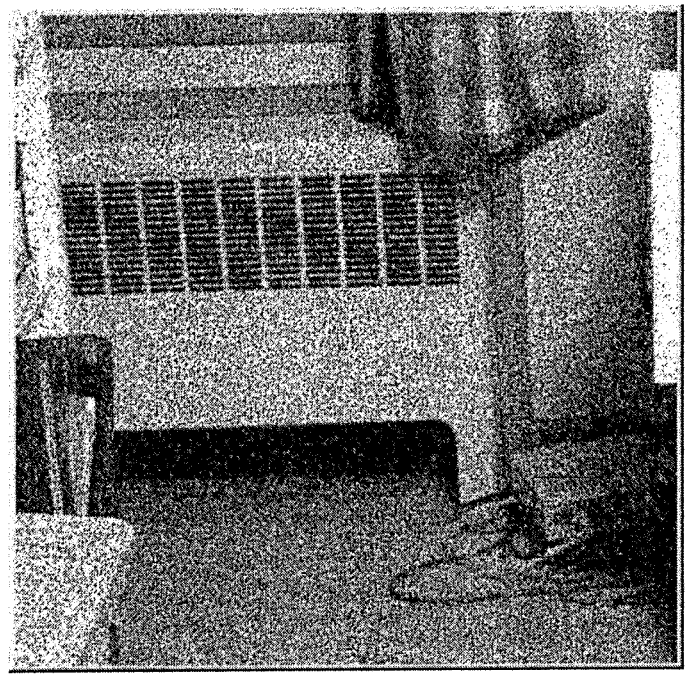
FIG. 8 comprises a frame from a 30-frame video after Gaussian noise was added.
Figure 9:
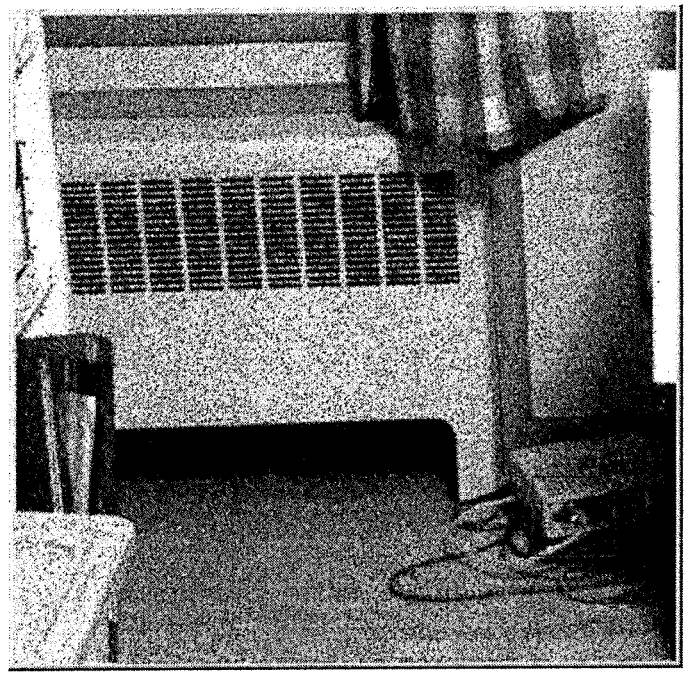
FIG. 9 comprises the same frame as in FIG. 8 but after the video with added noise was processed with the present method.

FIGS. 8 and 9 show the application of this method to a video from a hand-held camera. The original video is described in a paper Adler-Golden, S. M., S. C. Richtsmeier, and R. M. Shroll, "Suppression of Subpixel Sensor Jitter Fluctuations using Temporal Whitening," *Proc. SPIE* 6969, *Signal and Data Processing of Small Targets* 2008, 69691D (Apr. 16, 2008); doi: 10.1117/12.780005 ("[Adler-Golden, 2008]"), and consists of 30 frames taken with a consumer digital camera. FIG. 8 shows a frame of the video after Gaussian white noise equivalent to 15.7% of full scale was added to the video. FIG. 9 shows the same frame after the video with noise added was processed with the present method; the noise has been dramatically reduced, by between typically one-half to one order of magnitude. The method is far superior to simply averaging the frames together, which would suffer from reduced sharpness due to the motion resulting from the camera being hand-held.

A number of implementations have been described. Nevertheless, it will be understood that additional modifications may be made without departing from the scope of the inventive concepts described herein, and, accordingly, other embodiments are within the scope of the following claims.

What is claimed is:

1. A signal-to-noise enhancement method, comprising:
    receiving from a spectrometer a spectral dataset that comprises a multiplicity of spectra measured with the spectrometer, in which the number of spectra exceeds the number of measured wavelength bands of the spectrometer;
    estimating the covariance matrix of background noise associated with the measured spectra;
    transforming the multiplicity of spectra to Maximum Noise Fraction (MNF) components, each component comprising the coefficients resulting from projection of the multiplicity of spectra onto an individual MNF eigenvector;
    calculating nonlinear mathematical functions, associated with each individual MNF eigenvector, that convert the values of the MNF components of a given spectrum into estimated values of the corresponding noise-free MNF components of the given spectrum, in which the nonlinear mathematical functions are given by $S(y)=\exp(-|y/s|^p)/[r\exp(-y^2)+\exp(-|y/s|^p)]$;
    applying the inverse MNF transform to convert the estimated noise-free MNF components of the multiplicity of spectra back into the original units of the spectra; and
    generating an output spectral dataset from the converted estimated noise-free MNF components of the multiplicity of spectra.

2. A signal-to-noise enhancement method, comprising:
    receiving from a spectrometer a spectral dataset that comprises a multiplicity of spectra measured with the spectrometer, in which the number of spectra exceeds the number of measured wavelength bands of the spectrometer;
    estimating the covariance matrix of background noise associated with the measured spectra;
    transforming the multiplicity of spectra to Maximum Noise Fraction (MNF) components, each component comprising the coefficients resulting from projection of the multiplicity of spectra onto an individual MNF eigenvector;
    calculating nonlinear mathematical functions, associated with each individual MNF eigenvector, that convert the values of the MNF components of a given spectrum into estimated values of the corresponding noise-free MNF components of the given spectrum, in which the nonlinear mathematical functions are given by $S(y)=1/[r\exp(-y^2)+1]$;
    applying the inverse MNF transform to convert the estimated noise-free MNF components of the multiplicity of spectra back into the original units of the spectra; and
    generating an output spectral dataset from the converted estimated noise-free MNF components of the multiplicity of spectra.

3. A system, comprising:
    a spectrometer that provides a multiplicity of spectra, in which the number of spectra exceeds the number of measured wavelength bands of the spectrometer; and
    digital image processing circuitry which, in operation:
        estimates the covariance matrix of background noise associated with the measured spectra;
        transforms the multiplicity of spectra to Maximum Noise Fraction (MNF) components, each component comprising the coefficients resulting from projection of the multiplicity of spectra onto an individual MNF eigenvector;
        calculates nonlinear mathematical functions, associated with each individual MNF eigenvector, that convert the values of the MNF components of a given spectrum into estimated values of the corresponding noise-free MNF components of the given spectrum, in which the nonlinear mathematical functions are given by $S(y)=\exp(-|y/s|^p)/[r\exp(-y^2)+\exp(-|y/s|^p)]$;
        applies the inverse MNF transform to convert the estimated noise-free MNF components of the multiplicity of spectra back into the original units of the spectra; and
        generates an output spectral dataset from the converted estimated noise-free MNF components of the multiplicity of spectra.

4. A system, comprising:
    a spectrometer that provides a multiplicity of spectra, in which the number of spectra exceeds the number of measured wavelength bands of the spectrometer; and
    digital image processing circuitry which, in operation:
        estimates the covariance matrix of background noise associated with the measured spectra;
        transforms the multiplicity of spectra to Maximum Noise Fraction (MNF) components, each component comprising the coefficients resulting from projection of the multiplicity of spectra onto an individual MNF eigenvector;
        calculates nonlinear mathematical functions, associated with each individual MNF eigenvector, that convert the values of the MNF components of a given spectrum into estimated values of the corresponding noise-free MNF components of the given spectrum, in which the nonlinear mathematical functions are given by $S(y)=1/[r\exp(-y^2)+1]$;
        applies the inverse MNF transform to convert the estimated noise-free MNF components of the multiplicity of spectra back into the original units of the spectra; and
        generates an output spectral dataset from the converted estimated noise-free MNF components of the multiplicity of spectra.

5. The method of claim 1, in which the multiplicity of spectra comprise a hyperspectral image.

6. The method of claim 2, in which the multiplicity of spectra comprise a hyperspectral image.

7. The system of claim 3, in which the spectrometer comprises a hyperspectral imaging sensor.

8. The system of claim 4, in which the spectrometer comprises a hyperspectral imaging sensor.

* * * * *